Patented Mar. 19, 1935

1,994,992

UNITED STATES PATENT OFFICE 1,994,992

ORGANIC OXIDATION PRODUCTS AND PROCESS OF PREPARING THE SAME

Louis W. Haas, Chicago, and Herbert Otto Renner, Des Plaines, Ill., assignors, by mesne assignments, to J. R. Short Milling Company, Chicago, Ill., a corporation of Illinois No Drawing. Application December 27, 1932, Serial No. 649,110

29 Claims. (Cl. 260—16)

This invention relates to new oxidation products of organic compounds and processes of preparing the same. More particularly, the invention relates to organic oxidation products and the preparation thereof in the presence of material containing enzymes whereby oxidation of organic compounds is effected. For the sake of brevity, material containing enzymes is hereinafter designated as enzymic material.

Oxidation products prepared by this process serve as highly efficient bleaching agents for bleaching, for example, dough, oils, fats, and waxes, and food products in general.

In the process of the present invention, oxidation of organic compounds to any extent up to a practical or theoretical limit is accomplished by contacting oxidizable organic compositions and gas containing free oxygen in the presence of enzymic material containing enzymes which effect the catalytic oxidation of such compositions. It is found that the longer the period of treatment of certain compounds with air, oxygen or ozone, the greater is the degree of oxidation.

The degree of oxidation of an oxidizable organic material is readily determined by quantitative methods and may be expressed in terms of molecules (M) of hydrogen peroxide per 1000 grams of organic material or in grams of hydrogen peroxide per one hundred grams of organic matter. The so-called M-values are given below in the first mentioned terms.

Besides increasing the M-value of an organic composition by lengthening the time of treatment with oxygen, this value may also be increased by the addition of enzymic material, and by increasing the amounts of enzymic material in contact with the organic material treated. It is now shown that certain enzymic materials under given conditions have a strong catalyzing effect which cannot be obtained under similar conditions by the use of air or oxygen alone. The catalyzing effect is likewise not obtainable by mere commingling of air or oxygen with oil in the presence of water. An increase in concentration of enzymic material results in a corresponding increase in M-values so long as the mixture of enzymic material and organic matter treated permits of the most intensive incorporation of oxygen or air. It is readily seen that in order to obtain maximum oxidation with air, for instance, as the oxygen source, the system to be treated must at all times be supplied with as much air as possible, and the air must be brought in contact with the largest possible surface of the organic material treated within a given unit of time.

Various materials may be employed for supplying enzymes, and more particularly oxidizing enzymes including peroxidase, oxidase, catalase, and perhydridase, to be used as catalysts in the present process. Soya bean meal has been found to be an inexpensive and a convenient catalyst in the enzyme oxidation of organic materials. Other leguminous materials, including peas (for instance yellow peas) and beans (for instance navy beans) or mixtures of leguminous materials may be used. Extracts of leguminous materials may be employed to advantage in place of whole seed flour or meal. Such extracts may be employed either prior to or after clarification. In the case of soya beans, either the soya bean milk or the casein-free milk or extract may be used. As to the bean flour or other source herein mentioned, it should be noted that such flour or other source is not ordinary commercial material, but especially prepared so as to retain its enzyme value and therefore be "active" within the meaning of this specification.

EXTRACTION OF ENZYMIC AGENTS

For instance, extracts containing enzymes suitable for use in the present process may be prepared as follows: "Enzyme-active" whole soya beans are washed and soaked in an excess (2 or 3 times the quantity of beans) of cold water or preferably ice water for about six to sixteen hours or longer. The soaked beans are ground fine to permit of the most complete leaching out of the enzymes by water without clogging the pores of a filter used for separating the solid residue from the liquid. About 2000 parts by weight of ground, soaked beans are immersed in about 6500 parts by weight of cold water and the liquid is pressed out by suitable means after a few minutes of soaking, thereby producing a milky extract. About 20 parts by weight of calcium chloride are dissolved in water and added to the soya bean milk, while stirring. After a thorough mixing, the precipitate formed is allowed to settle for several hours. The clarified supernatant liquid is decanted and filtered.

The proportion of water used in the above extraction process may be varied, but care should be taken that all the soya casein precipitated by calcium chloride is removed, and the consistency of the casein-free extract does not interfere with its preparation and use. It is advantageous to obtain as high a concentration of oxidizing enzymes as possible in an extract.

As stated above the unclarified extract of soya beans, or soya bean milk may be used in my process, in which case the treatment with calcium chloride is omitted. However, the use of the milk makes it difficult to separate finely divided matter, added with the milk, from a treated organic composition to obtain a relatively pure enzyme oxidized product.

Navy beans, and peas, as a source of oxidizing enzymes possess certain advantages over soybeans. An important advantage is that in the use of navy beans and peas, no difficulty is experienced with large amounts of proteins and gums, the presence of which requires extra care when using soya bean milk. The steps necessary to prepare casein-free extracts become unnecessary when employing beans and peas. Thus, the whole extraction procedure is greatly simplified and the preparation of more concentrated extracts is made possible.

A navy bean extract is prepared as follows: 500 parts by weight of navy beans are soaked for about sixteen hours in approximately 2000 parts by weight of cold water. The soaked beans are ground and the ground material is immersed in the soaking water. The extract is separated from the pulp by decantation or by filtration or by centrifuging.

Fatty acid compounds including the acids themselves or the corresponding esters are readily oxidizable by the present process. Animal or vegetable oils or fats are suitable sources for such compounds. For instance, cocoanut oil, cottonseed oil, corn oil, poppyseed oil, butter, lard, hydrogenated fats or oils, and fatty acids or esters derived from the oils and fats mentioned may be treated. Oleic acid, for example commercial grades, is oxidizable by the present process.

In the description of the present process, the terms "oil" and "fat" may be used interchangeably.

Wherever the term "aeration" is used, it may be construed to mean the exposure of preferably all portions of the mix to air, pure oxygen or ozone, oxygen or ozone diluted with air, nitrogen, or other inert gas. Chemicals such as hydrogen peroxide may be employed as a source of oxygen. Oxygen may be liberated under the influence of catalase, for instance, which is usually contained in certain sources of oxidizing enzymes. Instead of agitating the mix by means of a mechanical stirrer, agitation may be accomplished by the oxygen-carrying gas.

Aeration may be performed in an open or in a closed vessel, or in other words under atmospheric or super-atmospheric pressure. Higher pressures are advantageous especially when higher concentrations of oxygen are employed.

Oxidation in the presence of enzymes is favorably affected by higher temperatures than room temperatures, as for instance up to substantially 50° C.

As indicated above, contact is made between oxidizable organic compositions and gas containing free oxygen in the presence of enzymic material. It is understood that any medium that makes this contact possible may be used and that such a medium acts as a carrier or dispersing agent for the reacting substances without impairing the enzymic reactivity required for the oxidizing treatment.

The following examples are given to illustrate the practical applications of the oxidation process carried on in the presence of enzymes:

PRODUCTION OF ENZYME OXIDIZED PRODUCTS

*Example I*

A mix consisting of about 300 parts by weight of cotton seed oil, partly hydrogenated (having an original M-value of 0.0095), and a suspension of 90 parts by weight of "active" soya flour in about 360 parts by weight of water, is thoroughly aerated by beating vigorously for about 240 minutes at about 120° F. to about 140° F. (48.8° to 60° C.). The fatty material thus treated is then separated from the other constituents of the mix by centrifuging or by extraction with suitable solvents.

A sample of the product obtained by this process employing centrifugal separation, showed an M-value of 0.1670. A sample of the product oxidized in the presence of enzymes isolated by extraction with ethyl or petrolic ether, and heating the extract to dryness until the residue reached a temperature of about 220° F. (104.4° C.), showed an M-value of 0.1503. This difference in the M-values is due to the increased temperature employed in drying the extracted product. The difference is quite small however, and indicates that the enzyme oxidized product is rather stable.

*Example II*

About 138 parts by weight of corn oil are mixed with a suspension of approximately 40 parts by weight of "active" soya flour in 200 parts by weight of water. To this mixture are added about 3 parts by weight of 40% hydrogen peroxide. The whole mix is intensively aerated for about forty-five minutes. The protein matter (casein) in the resulting mix is then separated by coagulation, or decreasing or completely offsetting its swelling capacity. A few parts by weight of 40% formaldehyde are added and the mix is heated to boiling, whereupon two layers form on standing. The top layer is removed, freed of the bulk of the water therein by centrifuging, and salt worked in, which causes exudation of the oxidized oil. The oil is decanted and is recovered as far as possible by centrifuging and pressing the residue.

A sample of oil thus obtained showed an M-value of 0.1654, indicating that hydrogen peroxide facilitates and accelerates the enzymic oxidation. After 45 minutes of aeration, a higher M-value is obtained than after 240 minutes in Example I. In Example II, it is found that formaldehyde may be used as a coagulant for proteins without apparent harm to the oxidizing power of the treated oil.

The amount of soya flour used varies preferably between about 16 and 30% of the amount of oil. Expressed in terms of percent of the total mix, the amount of soya flour used in Examples I and II is practically the same (12% and 10% respectively). The proportion of enzymic material in the mix may obviously be varied within very wide limits, depending to a large extent on the efficiency of the devices employed for agitation or aeration and the degree of oxidation desired or obtainable under given conditions. The proportions of other materials used may also be widely varied.

*Example III*

About 1380 parts by weight of corn oil, preferably refined, and about 3000 parts by weight of soya bean extract prepared in the manner described above, are thoroughly aerated for about four and one-half hours, a small amount of pure oxygen being introduced into the body of the mix while aerating. The resulting material is permitted to stand for a short while or until a separation into layers takes place. The top layer is removed, freed of water by centrifuging, or decantation, and aerated for about four hours at about 120° to 130° F. in the presence of about 4000 parts by weight of fresh soya bean extract and a moderate supply of pure oxygen. The enzyme oxidized fatty material may be separated from the treated mix as follows: The mix is allowed to stand (if necessary after adding a little formaldehyde in aqueous solution) in order to hasten the rising of the oil and casein to the surface and to form a top layer. The top layer is then separated from the lower layer and subjected to reduced pressure in order to remove gas (air or oxygen) which is finely distributed throughout the material. The gas-free material is centrifuged to separate water from the oil and protein matter. The oil is separated from the protein by treatment with salt and then by decanting or centrifuging and pressing of the residue in a hydraulic press or the like between filter cloth.

A sample of oxidized oil thus obtained showed an M-value of 0.50. The oil may be purified by centrifuging, heating on a water bath and then drying in vacuo. In contrast to the brownish yellow color of the original corn oil, the purified oxidized oil is of a pale lime-yellowish color. A sample of purified oil showed an M-value of 0.44.

*Example IV*

About 500 parts by weight of an extract of navy beans prepared in the manner described above, are mixed with about 138 parts by weight of corn oil and the mixture intensively aerated at about 110 to 120° F. for about two hours. Pure oxygen is bubbled through the emulsion during the last hour. Due to the presence of only small amounts of mucilaginous matter in the navy bean extract in contrast to soybean extract, the mix foams only slightly. This behavior greatly facilitates the separation of the treated oil, which is accomplished by heating the whole mixture to boiling after addition of a very small amount of diluted formaldehyde, then centrifuging, working the upper of two layers obtained thereby with salt, and then pressing the liquid from the resulting mixture. A sample of clear oil thus obtained, showed an M-value of 0.225.

*Example V*

About 360 parts by weight of soya oil, 360 parts by weight of water and 150 parts by weight of soya flour are mixed together and thoroughly aerated. Water is added if the mix gets too stiff during aeration. At the end of four hours of aeration, about 400 parts by weight of water and 30 parts by weight of fresh soya bean flour are added to the mix to obtain the consistency of thick cream. The aeration is continued and the creamy consistency maintained by adding water from time to time and also by adding fresh soya flour at intervals of for instance every two hours. The soya oil is finally clarified and purified. At the end of fourteen hours aeration, a sample of oil showed an M-value of .5074.

In the above examples, crushed sesame seeds may be added to the mix in addition to soya bean flour or extract. This results in an increase in the M-value, the value being higher than that of the fat or oil oxidized in the presence of soya bean flour alone as a source of enzymes. For instance the aeration of a mix comprising 300 parts by weight of fat, 360 parts by weight of water, 150 parts by weight of soya bean flour, and 60 parts by weight of crushed sesame seeds for four hours resulted in an oxidized product having an M-value nearly 7% higher than that obtained without sesame seeds after seven hours aeration.

In the preparation of enzyme oxidized products by this process certain characteristics of these products have been noted. The enzymic oxidation of fats and oils, for instance, does not perceptibly change their consistency. Boiling of the enzyme oxidized products in water for several hours does not destroy the effects of oxidation although continued heating to boiling temperatures might. Heating of solutions of enzyme oxidized fats or oils in organic solvents such as petrolic or ethyl ether until after the evaporation of the solvent and until a temperature of 220° F. is reached, only slightly affects their M-value.

As to the use of oxidized fats in dough bleaching processes, reference is made to our copending application, Serial No. 654,304 filed January 30, 1933. As there pointed out, the products of the present invention are readily miscible with shortenings. These mixtures or the enzyme oxidized products themselves may be employed as shortenings to be used for baking purposes. Such shortenings, while thus employed, although they serve to some extent to bleach dough during mixing and fermentation, exert their main bleaching action during baking of the dough.

The invention has been disclosed herein for illustrative purposes in its preferred embodiment, but it is to be understood that the scope of the invention is defined by the appended claims rather than by the foregoing description.

What we claim is:

1. A process of preparing organic oxidation products, which process comprises contacting oxidizable organic matter and gas containing free oxygen in the presence of enzymic material containing enzymes to effect the catalytic oxidation of the organic matter, the said oxidizable organic matter being selected from a group consisting of animal oils and fats, vegetable oils and fats, hydrogenated oils and fats, and fatty acids and esters from said oils and fats.

2. A fatty acid composition oxidized in the presence of enzymic material containing oxidizing enzymes.

3. A process of preparing organic oxidation products, which process comprises contacting an oxidizable fatty acid composition and gas containing free oxygen in the presence of enzymic material containing enzymes to effect the catalytic oxidation of the composition.

4. A vegetable fatty material oxidized in the presence of enzymic material containing oxidizing enzymes.

5. A process of preparing organic oxidation products, which process comprises contacting vegetable fatty material and gas containing free oxygen in the presence of enzymic material containing enzymes to effect the catalytic oxidation of the fatty material.

6. An animal fatty material treated with gas containing free oxygen in the presence of enzymic material containing oxidizing enzymes.

7. A process of preparing organic oxidation products, which process comprises contacting animal fatty material and gas containing free oxygen in the presence of enzymic material containing enzymes to effect the catalytic oxidation of the fatty material.

8. A process of preparing organic oxidation products, which process comprises contacting oxidizable organic matter and oxygen in the presence of enzymic material containing enzymes to effect the catalytic oxidation of the organic matter, the said oxidizable organic matter being selected from a group consisting of animal oils and fats, vegetable oils and fats, hydrogenated oils and fats, and fatty acids and esters from said oils and fats.

9. A process of preparing organic oxidation products, which process comprises contacting oxidizable organic matter and ozone in the presence of enzymic material containing enzymes to effect the catalytic oxidation of the organic matter, the said oxidizable organic matter being selected from a group consisting of animal oils and fats, vegetable oils and fats, hydrogenated oils and fats, and fatty acids and esters from said oils and fats.

10. A process of preparing organic oxidation products, which process comprises contacting oxidizable organic matter and gas containing free oxygen in the presence of vegetable enzyme material containing enzymes to effect the catalytic oxidation of the organic matter, the said oxidizable organic matter being selected from a group consisting of animal oils and fats, vegetable oils and fats, hydrogenated oils and fats, and fatty acids and esters from said oils and fats.

11. A process of preparing organic oxidation products, which process comprises contacting oxidizable organic matter and gas containing free oxygen in the presence of soya bean enzymic material to effect the catalytic oxidation of the organic matter, the said oxidizable organic matter being selected from a group consisting of animal oils and fats, vegetable oils and fats, hydrogenated oils and fats, and fatty acids and esters from said oils and fats.

12. A process of preparing organic oxidation products, which process comprises contacting oxidizable organic matter and gas containing free oxygen in the presence of navy bean enzymic material to effect the catalytic oxidation of the organic matter, the said oxidizable organic matter being selected from a group consisting of animal oils and fats, vegetable oils and fats, hydrogenated oils and fats, and fatty acids and esters from said oils and fats.

13. A process of preparing organic oxidation products, which process comprises contacting oxidizable organic matter and gas containing free oxygen in the presence of pea enzymic material to effect the catalytic oxidation of the organic matter, the said oxidizable organic matter being selected from a group consisting of animal oils and fats, vegetable oils and fats, hydrogenated oils and fats, and fatty acids and esters from said oils and fats.

14. A process of preparing organic oxidation products, which process comprises contacting oxidizable organic matter and gas containing free oxygen in the presence of oxidizing enzyme material to effect the catalytic oxidation of the organic matter the said oxidizable organic matter being selected from a group consisting of animal oils and fats, vegetable oils and fats, hydrogenated oils and fats, and fatty acids and esters from said oils and fats.

15. A process of preparing organic oxidation products, which process comprises dispersing oxidizable organic matter and enzymic material in a liquid medium that does not impair the enzymic reactivity required for the ensuing reaction, the said oxidizable organic matter being selected from a group consisting of animal oils and fats, vegetable oils and fats, hydrogenated oils and fats, and fatty acids and esters from said oils and fats, contacting the resulting dispersion with gas containing free oxygen to oxidize the said organic matter, and separating the enzyme oxidized organic matter from the resulting substances.

16. A process of preparing organic oxidation products, which process comprises dispersing oxidizable organic matter and enzymic material in a liquid medium that does not impair the enzymic reactivity required for the ensuing reaction, the said oxidizable organic matter being selected from a group consisting of animal oils and fats, vegetable oils and fats, hydrogenated oils and fats, and fatty acids and esters from said oils and fats, contacting the resulting dispersion with oxygen to oxidize the said organic matter, and separating the oxidized organic matter from the resulting substances.

17. A process of preparing organic oxidation products which process comprises dispersing oxidizable organic matter and soya bean enzymic matter in a liquid medium that does not impair the enzymic reactivity required for the ensuing reaction, the said oxidizable organic matter being selected from a group consisting of animal oils and fats, vegetable oils and fats, hydrogenated oils and fats, and fatty acids and esters from said oils and fats, contacting the resulting dispersion with gas containing free oxygen to oxidize the said organic matter, and separating the enzyme oxidized organic matter from the resulting substances.

18. A process of preparing organic oxidation products which process comprises dispersing oxidizable organic matter and navy bean enzymic matter in a liquid medium that does not impair the enzymic reactivity required for the ensuing reaction, the said oxidizable organic matter being selected from a group consisting of animal oils and fats, vegetable oils and fats, hydrogenated oils and fats, and fatty acids and esters from said oils and fats, contacting the resulting dispersion with gas containing free oxygen to oxidize the said organic matter, and separating the enzyme oxidized organic matter from the resulting substances.

19. A process of preparing organic oxidation products, which process comprises dispersing oxidizable organic matter and pea enzymic matter in a liquid medium that does not impair the enzymic reactivity required for the ensuing reaction, the said oxidizable organic matter being selected from a group consisting of animal oils and fats, vegetable oils and fats, hydrogenated oils and fats, and fatty acids and esters from said oils and fats, contacting the resulting dispersion with gas containing free oxygen to oxidize the said organic matter, and separating the enzyme oxidized organic matter from the resulting substances.

20. A process of preparing organic oxidation products, which process comprises dispersing oxidizable organic matter and oxidizing enzymes in a liquid medium that does not impair the enzymic reactivity required for the ensuing reaction, the said oxidizable organic matter being selected from a group consisting of animal oils and fats, vegetable oils and fats, hydrogenated oils and fats, and fatty acids and esters from said oils and fats, contacting the resulting dispersion with gas containing free oxygen to oxidize the said organic matter, and separating the enzyme oxidized organic matter from the resulting substances.

21. A process of preparing organic oxidation products, which process comprises emulsifying oxidizable organic matter with an aqueous medium containing oxidizing enzyme material, the said aqueous medium serving as a carrier for said enzyme material and the said oxidizable organic matter being selected from a group consisting of animal oils and fats, vegetable oils and fats, hydrogenated oils and fats, and fatty acids and esters from said oils and fats, adding a small proportion of an inorganic peroxide, contacting the resulting emulsion with gas containing free oxygen to oxidize the fat or fatty oil material, and separating the enzyme oxidized material from the resulting substances.

22. A process of preparing a bleaching agent, which process comprises dispersing fatty material and enzymic material containing oxidizing enzymes in a liquid medium that does not impair the enzymic reactivity required for the ensuing reaction, aerating the resulting mixture to oxidize the fatty material in the presence of the enzymic material, and separating the enzyme oxidized fatty material from the mixture.

23. A process of preparing a bleaching agent, which process comprises mixing fatty material and enzymic material containing oxidizing enzymes with water, aerating the resulting mixture to bring about contact of all the particles of the mixture with oxidizing gas to effect thorough oxidation of the fatty material, and separating the enzyme oxidized fatty material from the mixture.

24. A process of preparing a bleaching agent, which process comprises mixing a fatty material and soya flour with water and hydrogen peroxide, aerating the resulting mixture to oxidize fatty matter in the said fatty material, and separating the treated fatty material from the said mixture.

25. A process of preparing a bleaching agent which process comprises mixing a fatty material, soya flour and crushed sesame seed with water, aerating the resulting mixture to oxidize fatty matter in the said fatty material, and separating the treated fatty material from the said mixture.

26. A process of preparing a bleaching agent, which process comprises dispersing fatty material and enzymic material in a liquid medium that does not impair the enzymic reactivity required for the ensuing reaction, aerating the resulting mixture until the M-value of the enzyme oxidized fatty material is substantially increased, and separating the oxidized fatty material from the mixture.

27. A fatty material having bleaching properties and comprising fatty acid compounds oxidized in the presence of oxidizing enzymes.

28. A process of preparing a bleaching agent, which process comprises mixing soya oil and soya flour with water, aerating the resulting mixture to oxidize the said soya oil, and separating the enzyme oxidized soya oil from the mixture.

29. A process of preparing a bleaching agent, which process comprises mixing fatty material and enzymic material containing oxidizing enzymes with water, aerating the resulting mixture while repeatedly adding fresh portions of said enzymic material to thereby accelerate oxidization of the fatty material, and separating the enzyme oxidized fatty material from the mixture.

LOUIS W. HAAS.
HERBERT OTTO RENNER.